US007428089B2

(12) United States Patent
Hisa

(10) Patent No.: US 7,428,089 B2
(45) Date of Patent: Sep. 23, 2008

(54) OPTICAL SCANNING DEVICE AND IMAGE FORMING APPARATUS

(75) Inventor: Fumiya Hisa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 303 days.

(21) Appl. No.: 11/434,756

(22) Filed: May 17, 2006

(65) Prior Publication Data

US 2007/0024942 A1 Feb. 1, 2007

(30) Foreign Application Priority Data

Jul. 27, 2005 (JP) ............................ 2005-217657

(51) Int. Cl.
*G02B 26/08* (2006.01)
*B41J 27/00* (2006.01)

(52) U.S. Cl. ...................... 359/212; 359/198; 359/204; 359/216; 347/243; 347/257; 347/261

(58) Field of Classification Search ...................... None
See application file for complete search history.

(56) References Cited

U.S. PATENT DOCUMENTS 5,671,081 A * 9/1997 Hisa .......................... 359/216
6,195,190 B1 * 2/2001 Tachibe et al. .............. 359/216
6,567,201 B1 * 5/2003 Tsuchida ................... 359/204

FOREIGN PATENT DOCUMENTS

| | | |
|---|---|---|
| JP | A-3-279910 | 12/1991 |
| JP | A-11-052275 | 2/1999 |
| JP | B2-3550008 | 4/2004 |

* cited by examiner

*Primary Examiner*—James Phan
(74) *Attorney, Agent, or Firm*—Morgan, Lewis & Bockius LLP

(57) ABSTRACT

An optical scanning device includes a light source that emits a light beam, an optical deflector at which a light beam emitted from the light source is incident, the optical deflector deflecting the incident light beam, an optical system that guides the deflected light beam to surface to be scanned by the deflected light beam, a driving device that drives at least a portion of the optical deflector, a thermal storage member mounted on the driving device, the thermal storage member absorbing and storing heat generated by the driving device, thereby controlling a temperature gradient of the driving device, and a casing body that accommodates the light source, the optical deflector, the optical system, the driving device, and the thermal storage member.

18 Claims, 17 Drawing Sheets

OPTICAL SCANNING DEVICE AND IMAGE FORMING APPARATUS

CROSS-REFERENCE TO RELATED APPLICATION

This application claims priority under 35 USC 119 from Japanese Patent Application No. 2005-217657, the disclosure of which is incorporated by reference herein.

BACKGROUND

1. Technical Field

The present invention relates to an optical scanning device and an image forming apparatus, and more particularly relates to an optical scanning device at which plural optical systems and a heat-generating component are disposed in a single container, the optical systems respectively guiding plural light beams which have been deflectingly scanned by a light-deflecting element, and to an image forming apparatus which is equipped with this optical scanning device.

2. Related Art

An electrophotographic-system color image forming apparatus deflectingly scans plural light beams corresponding to the colors Y (yellow), M (magenta), C (cyan) and K (black), or the like, with an optical deflector which is mounted at an optical scanning device, and forms a color image by focusing the respective colors through plural optical systems onto a photosensitive drum. In such a color image forming apparatus, image formation timings of the colors are regulated in accordance with a device temperature, which is measured by an environment sensor (a temperature sensor). Thus, color shifts between color images (reading registration errors) that are caused by temperature variations of the device are corrected for ("color registration correction").

In recent years, in order to suppress costs, housings of optical scanning devices have come to be made of molded resin components, and as optical deflectors, inexpensive general purpose unitized components formed as units are being used. In such units, a polygon mirror and a motor are disposed on a circuit board, which serves as a base for the optical deflector, and a motor-driving IC, for controlling rotary driving of the motor, and the like are also mounted at the circuit board.

However, with an optical deflector which is formed as a unit in this manner, because the whole of the optical deflector is accommodated in the housing of the optical scanning device, heat which is generated by heat-generating components, such as the motor-driving IC and the like, tends to accumulate within the housing. Hence, with a housing made of resin, which has lower thermal conductivity (heat absorption and heat dissipation characteristics) than a metal model made of die-cast aluminum or the like, interior heat is less easily propagated through the housing and dissipated. Therefore, particularly just after the device starts to operate, when the amount of temperature increase is large, there is a difference in temperature gradient between an interior temperature of the optical scanning device (the housing) and the temperature that is measured by an environment sensor. Thus, there is a problem in that color registration errors will occur.

As is shown in FIG. 14, when, for example, the temperature variation of a color image forming apparatus is observed over a 30-minute period after startup, the motor-driving IC of the optical deflector rapidly rises in temperature for about 3 minutes after startup, and then gradually stabilizes. Meanwhile, the interior of the optical scanning device (housing) gradually rises in temperature for about 25 minutes after startup, and substantially stabilizes at an increase of about 3.5° C.

On the other hand, because propagation of heat through the housing is low and propagation of heat through the air is dominant after startup, a rate of heat conduction to the environment sensor is slow, and the environment sensor has no observable rise in temperature for about 8 minutes after startup, thereafter rises only gradually, and does not match the temperature in the optical scanning device until about 30 minutes has passed.

Thus, just after the device starts operation, there is a difference between a gradient of the temperature in the optical scanning device and a gradient of the device temperature that is measured by the environment sensor, and the rise of the environment sensor is slower than the temperature rise of the optical scanning device interior. Therefore, when a reading registration difference between, for example, the color C and the color K is observed, as is shown in the graph for an IOT (Image Output Terminal) in FIG. 15, a registration error just before input of a registration control cycle is large. Furthermore, when the polygon mirror of the optical scanning device (ROS: Raster Output Scanner) is rotated and laser light sources are illuminated, a graph showing the reading registration difference between the color C and the color K at the optical scanning device ('ROS unit body') is similar to the above-mentioned graph for the IOT. From this, it is understood that effects of heat sources other than the optical scanning device on deterioration in color registration at the IOT just after startup are small, and the deterioration in color registration is mainly determined by characteristics of the optical scanning device.

Further, as shown in FIG. 16, reading registration offsets of the color C and the color K are set in relatively opposite directions, with the color C at a minus side, and the color K at a plus side. Thus, offset amounts are large. Note that differences between offset amounts of the color C and offset amounts of the color K in FIG. 16 constitute the graph of reading registration errors of the ROS unit body shown in FIG. 15.

FIG. 17 shows a schematic diagram of the structure of the optical scanning device at which the various data shown in FIGS. 14 to 16 have been measured. At an optical scanning device 110CK shown in FIG. 17, two different optical systems corresponding to the color C and the color K are provided at a single housing (optical casing) 112, which is made of resin. A light beam K corresponding to the color K, which is deflectingly scanned by a polygon mirror 54 of an optical deflector, passes through f-θ lenses 56 and 58, is reflected by a total of four mirrors—a cylindrical mirror 60K, a reflection mirror 62K, a cylindrical mirror 64K and a reflection mirror 66K—and is focused on a photosensitive drum 24K. Similarly, a light beam C corresponding to the color C, which is deflectingly scanned by the polygon mirror 54, passes through the f-θ lenses 56 and 58, is reflected by a total of three mirrors—a cylindrical mirror 60C, a reflection mirror 62C and a cylindrical mirror 64C—and is focused on a photosensitive drum 24C.

Now, just after startup of the device, besides the motor-driving IC of the optical deflector, a driving IC at which a laser light source driver (LDD) or the like is mounted also rapidly rises in temperature at the time of startup. Air inside the optical scanning device 110CK is warmed by these heat-generating components, and the air is agitated by rotation of the polygon mirror 54. Consequently, a distribution of temperature in the optical scanning device 110CK alters or a hot air flow impinges on the optical system (for example, on a reflection mirror directly or on a support of a reflection mirror), and a temperature thereof is increased. Thus, when, for example, the light beams C and K pass through the f-θ lenses 56 and 58 and are initially incident on the cylindrical mirrors 60C and 60K and are inclined in the same direction, the light beams C and K that have been reflected by the cylindrical mirrors 60C and 60K are shifted as shown by the broken lines, and the reading registrations on the photosensitive drums 24C and 24K are offset to respectively opposite sides (see FIG. 16). Thus, the difference which is a color registration error becomes large.

As countermeasures for the color registration error which is generated in this manner, for example, reducing a time interval between temperature measurements by the environment sensor and increasing a number of registration control cycles have been considered. However, in such cases, while the color registration error described above can be avoided, the number of down-times, at which image output operations are stopped, increases and usability deteriorates.

SUMMARY OF THE INVENTION

According to an aspect of the present invention, an optical scanning device includes a light source that emits a light beam, an optical deflector at which a light beam emitted from the light source is incident, the optical deflector deflecting the incident light beam, an optical system that guides the deflected light beam to surface to be scanned by the deflected light beam, a driving device that drives at least a portion of the optical deflector, a thermal storage member mounted on the driving device, the thermal storage member absorbing and storing heat generated by the driving device, thereby controlling a temperature gradient of the driving device, and a casing body that accommodates the light source, the optical deflector, the optical system, the driving device, and the thermal storage member.

BRIEF DESCRIPTION OF THE DRAWINGS

Exemplary embodiments of the present invention will be described in detail based on the following figures, in which.

DETAILED DESCRIPTION

Herebelow, exemplary embodiments of the present invention will be described in detail with reference to the drawings.

First Exemplary Embodiment

Figure 1:
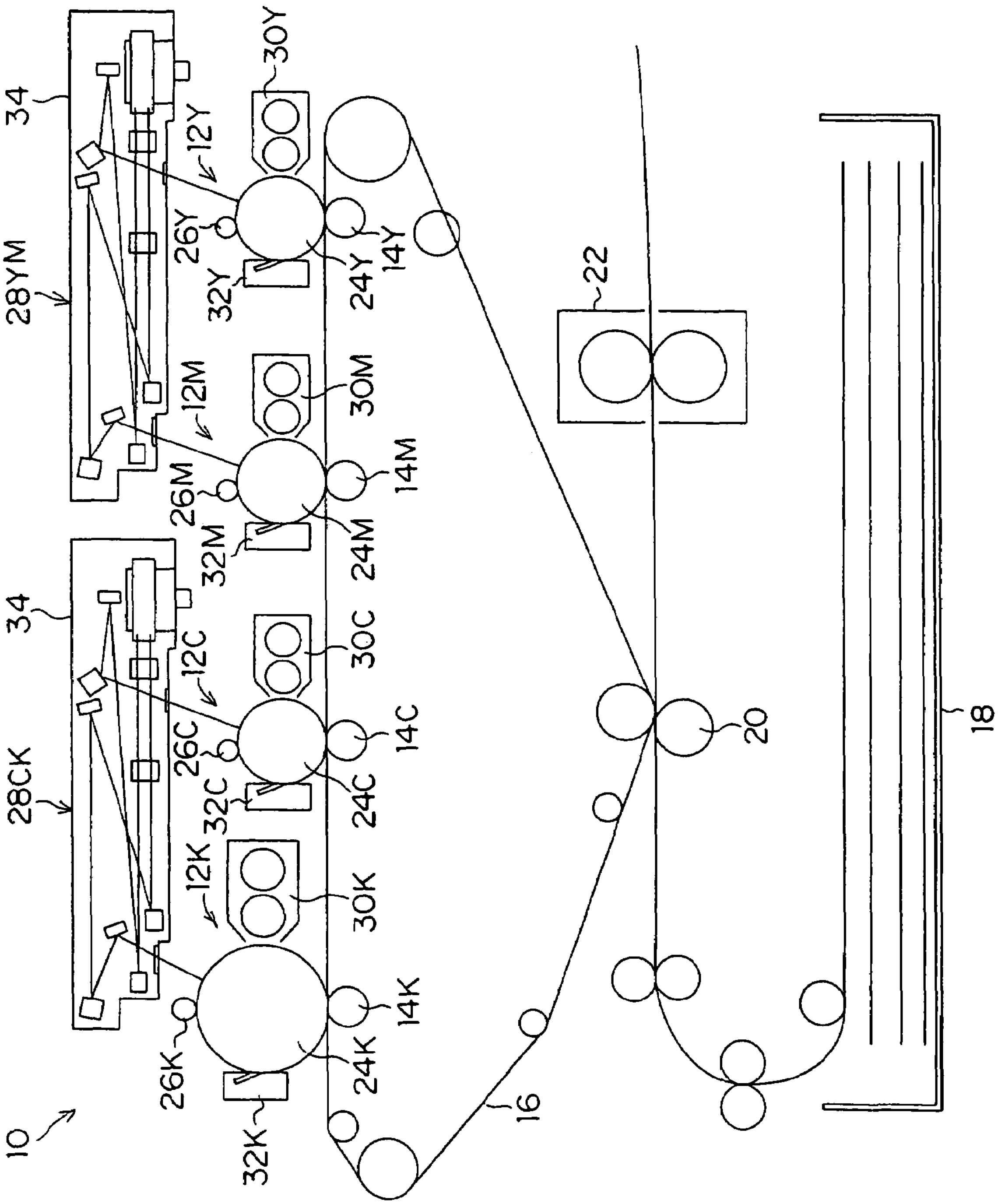
FIG. 1 is a schematic view showing the structure of an image forming apparatus relating to a first exemplary embodiment of the present invention.

An image forming apparatus 10 according to this exemplary embodiment is provided with an optical scanning device 28CK and an optical scanning device 28YM, as shown in FIG. 1. The optical scanning device 28CK scans for exposing a photosensitive drum 24C and a photosensitive drum 24K, and is provided with optical systems corresponding to the colors C (cyan) and K (black). The optical scanning device 28YM scans for exposing a photosensitive drum 24Y and a photosensitive drum 24M, and is provided with optical systems corresponding to the colors Y (yellow) and M (magenta).

The image forming apparatus 10 is also provided with electrophotographic units 12Y, 12M, 12C and 12K, which form toner images of the four colors Y (yellow), M (magenta), C (cyan) and K (black). The electrophotographic unit 12Y is structured with a charging device 26Y, the optical scanning device 28YM, a developing device 30Y, a first transfer device 14Y and a cleaning device 32Y disposed around the photosensitive drum 24Y. The electrophotographic units 12M, 12C and 12K have similar structures thereto.

The image forming apparatus 10 is also provided with an intermediate transfer belt 16, a second transfer device 20 and a fixing device 22. Respective toner images are layered by the first transfer devices 14Y to 14K to form a color toner image on the intermediate transfer belt 16. The second transfer device 20 transfers the color toner image that has been transferred onto the intermediate transfer belt 16 to paper, which is supplied from a tray 18. The fixing device 22 fuses and fixes the color toner image that has been transferred onto the paper.

Figure 2:
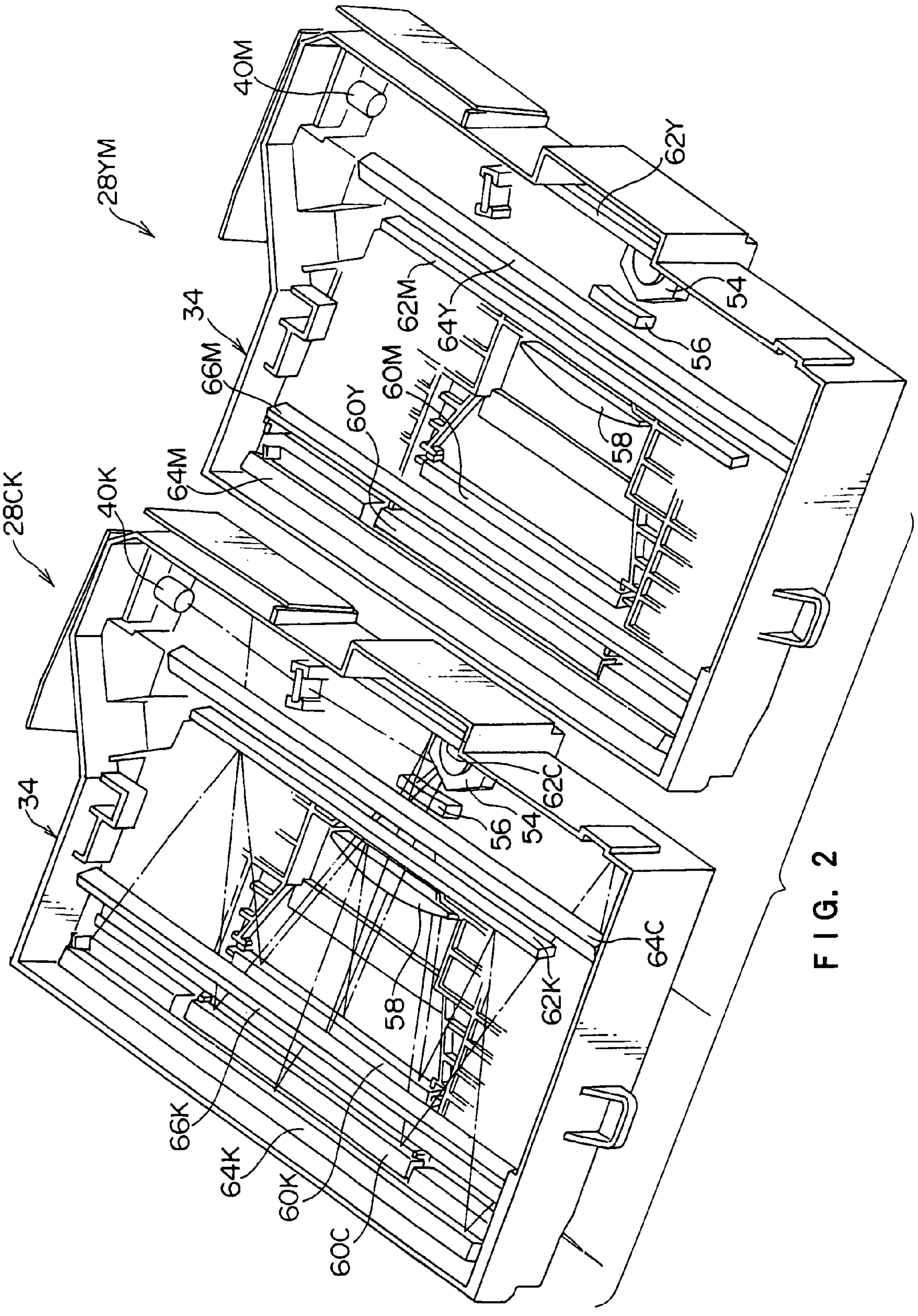
FIG. 2 is a perspective view showing optical scanning devices relating to the first exemplary embodiment of the present invention.

As shown in FIG. 2, the optical scanning devices 28CK and 28YM are provided with rectangular box-form housings 34 made of resin (which are molded components). Herein, because internal structures of the optical scanning devices 28CK and 28YM are substantially the same, only the optical scanning device 28CK will be described.

Figure 3:
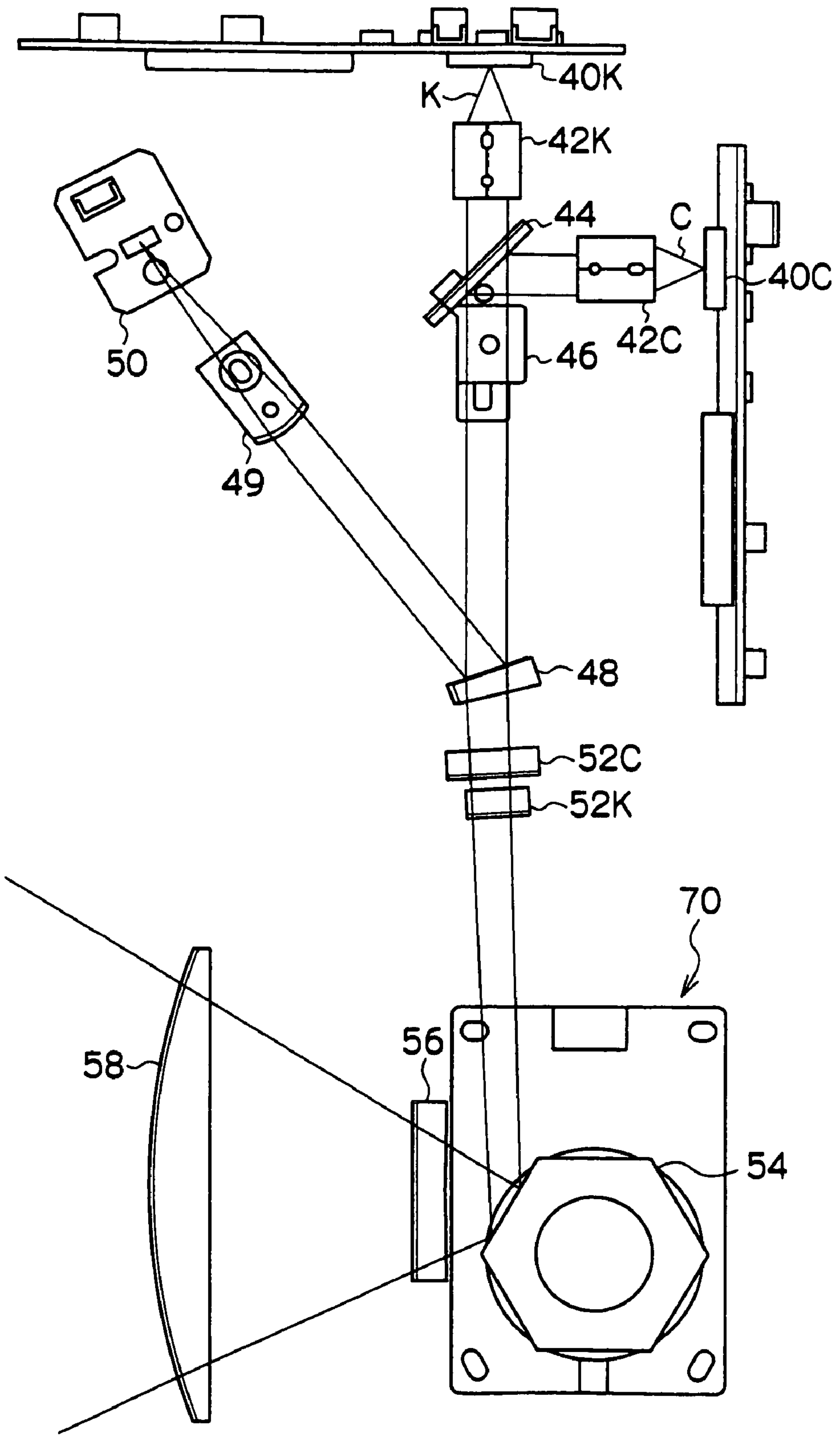
FIG. 3 is a plan view showing principal structural components of an optical scanning device relating to the first exemplary embodiment of the present invention.
Figure 4:
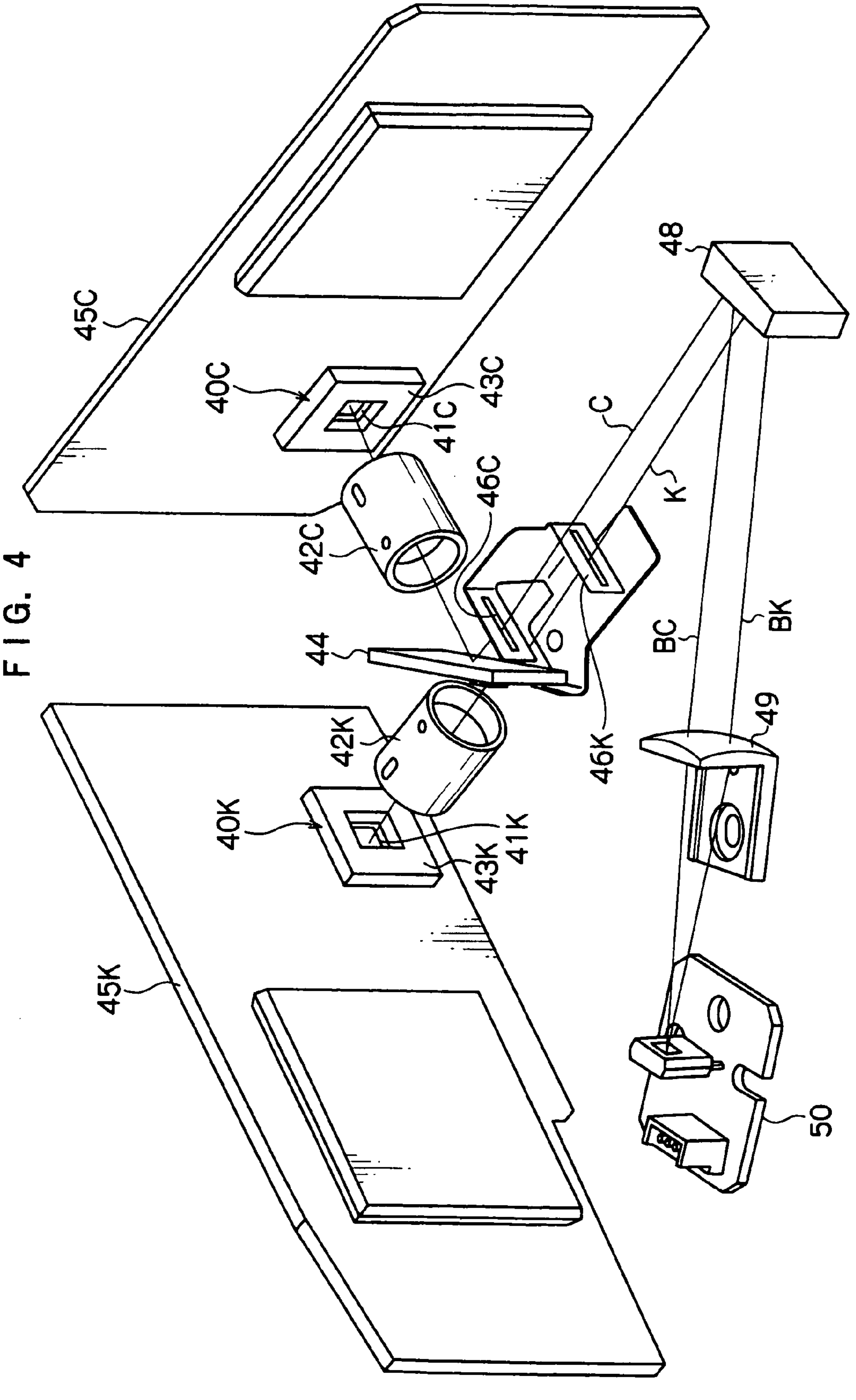
FIG. 4 is a perspective view showing the principal structural components of the optical scanning device relating to the first exemplary embodiment of the present invention.

As shown in FIGS. 3 and 4, a light source portion 40K, which emits a light beam K corresponding to the color K, and a light source portion 40C, which emits a light beam C corresponding to the color C, are disposed in the housing 34 such that emission directions thereof are substantially at 90° to one another. In this exemplary embodiment, surface emission-type semiconductor lasers are employed as the emitting light sources. As shown in FIG. 4, the light source portions 40C and 40K are structured with surface emission laser chips 41C and 41K and retaining members 43C and 43K. The surface emission laser chips 41C and 41K are formed to be capable of simultaneously emitting plural optical lasers. The retaining members 43C and 43K are members for retaining the surface emission laser chips 41C and 41K, are referred to with the usual term 'LCC' (leadless chip carrier), and ceramics are employed as materials thereof herein. The surface emission laser chips 41C and 41K are electrically connected, through the retaining members 43C and 43K, to circuit boards 45C and 45K, respectively, at which electrical circuits are mounted.

The light source portion 40C which emits the light beam C is disposed to be offset in a height direction relative to the light source portion 40K which emits the light beam K, and the light beam C and the light beam K are arranged so as to be a predetermined distance apart in the height direction.

A collimator lens unit 42K, for making light of the light beam K parallel, is disposed on an optical path of the light beam K emitted from the light source portion 40K. The light beam K that has passed through the collimator lens unit 42K passes beneath a reflection mirror 44, is incident at a slit plate 46K and is incident on a half-mirror 48, which is disposed on the optical path. The half-mirror 48 divides the light beam K into a transmitted light beam K and a reflected light beam BK in a predetermined ratio. The light beam BK is reflected and is incident at an optical power monitor 50. Because a surface emission optical laser is employed in this exemplary embodiment, it is not possible to obtain light for light amount control from a backbeam. Therefore, a portion of the light beam emitted in a forward direction is utilized by this division with the half-mirror 48. The light beam K that has been transmitted through the half-mirror 48 passes through a cylindrical lens 52K and is incident at a polygon mirror 54 of an optical deflector 70 which is disposed on the optical path, as shown in FIG. 3.

Meanwhile, a collimator lens unit 42C, for making light of the light beam C parallel, is disposed on an optical path of the light beam C emitted from the light source portion 40C. The light beam C that has passed through the collimator lens unit 42C is deflected by the reflection mirror 44, is incident at a slit plate 46C and is incident on the half-mirror 48 disposed on the optical path. The half-mirror 48 divides the light beam C into a transmitted light beam C and a reflected light beam BC in a predetermined ratio. The light beam BC is reflected and is incident at the optical power monitor 50. The light beam C that has been transmitted through the half-mirror 48 passes through a cylindrical lens 52C and is incident at the polygon mirror 54 of the optical deflector 70 which is disposed on the optical path as shown in FIG. 3.

Figure 5:
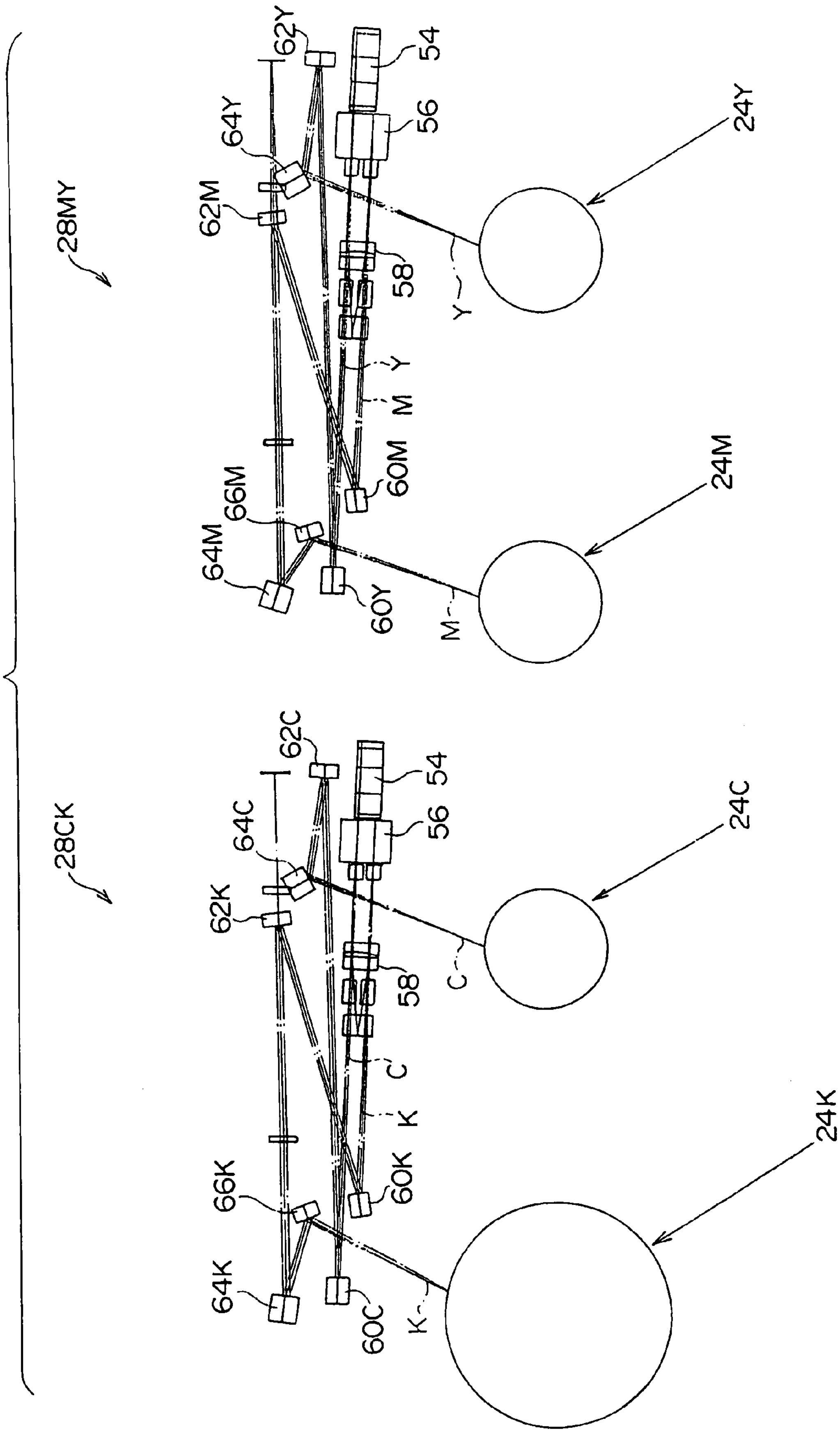
FIG. 5 is a diagram showing light paths of the optical scanning devices relating to the first exemplary embodiment of the present invention.

Plural reflection mirror faces are provided at the polygon mirror 54. As shown in FIG. 5, the light beams C and K that are incident at the polygon mirror 54 are deflectingly reflected by the reflection mirror faces and enter f-θ lenses 56 and 58. The polygon mirror 54 and the f-θ lenses 56 and 58 are of sizes which are capable of scanning the light beams C and K simultaneously.

The light beams for the two colors C and K which have passed through the f-θ lenses 56 and 58 are separated and are reflected at respective cylindrical mirrors 60C and 60K, which have power in a sub-scanning direction. The light beam K that has been reflected by the cylindrical mirror 60K is doubled back to a reflection mirror 62K, is then deflected by a cylindrical mirror 64K and a reflection mirror 66K, and is focused at the photosensitive drum 24K to form an electrostatic latent image.

Meanwhile, the light beam C that has been reflected by the cylindrical mirror 60C is doubled back to a reflection mirror 62C, is then deflected by a cylindrical mirror 64C, and is focused on the photosensitive drum 24C to form an electrostatic latent image.

Thus, at the optical scanning device 28CK (or 28YM) of this exemplary embodiment, plural (two) different optical systems are provided in one of the housings 34.

Figure 6:
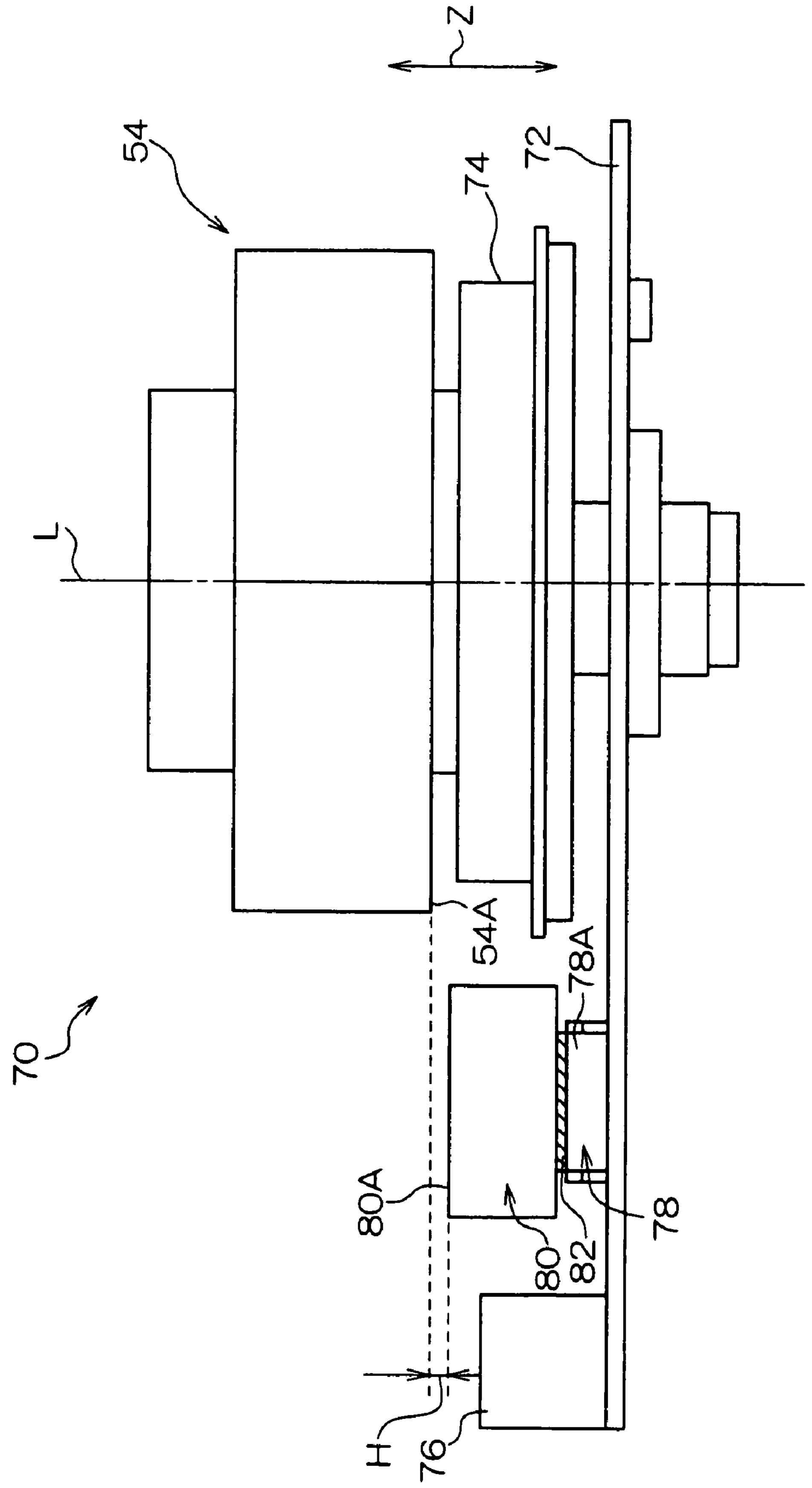
FIG. 6 is a front view showing an optical deflector at which a thermal storage member relating to the first exemplary embodiment of the present invention is provided.
Figure 7:
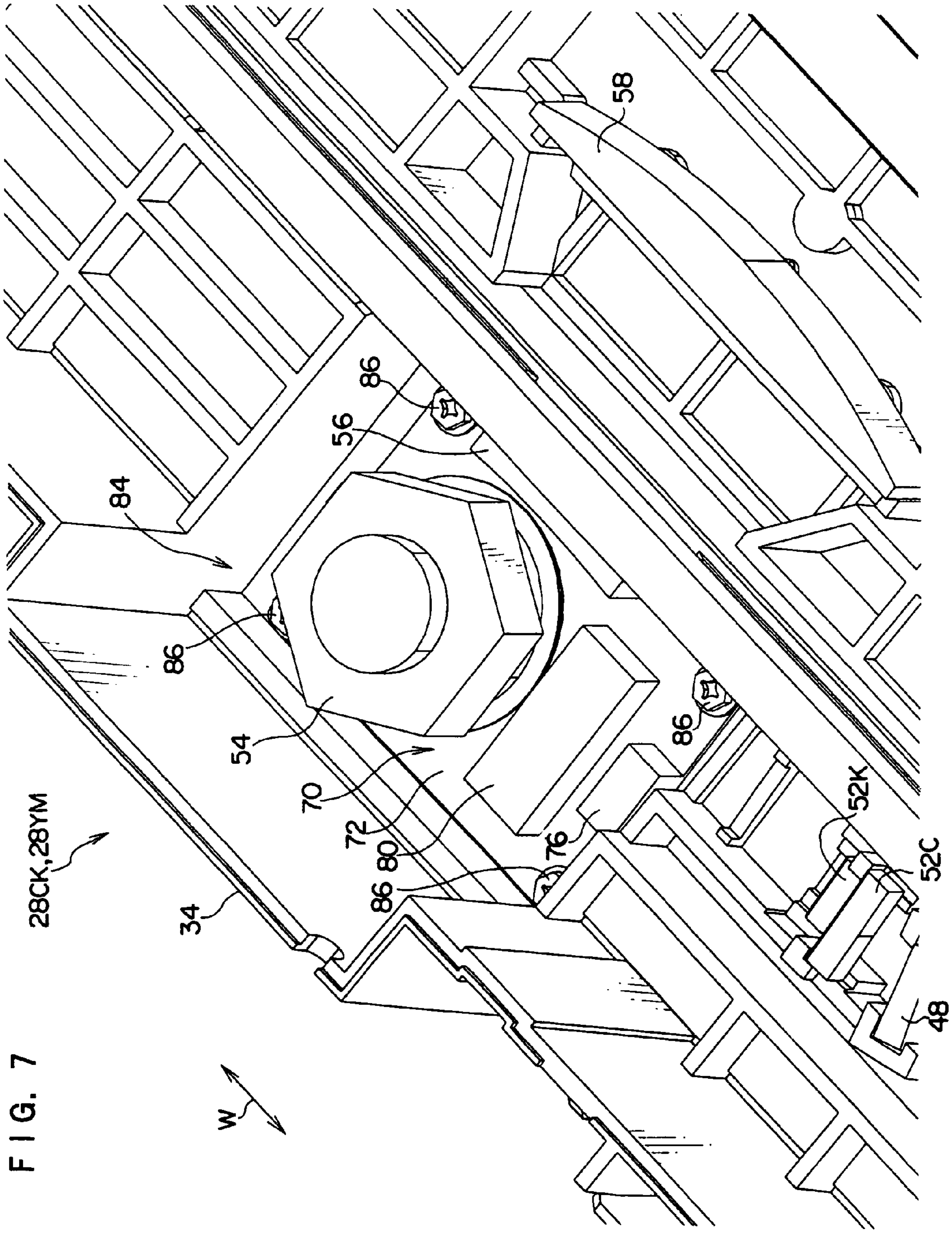
FIG. 7 is a perspective view showing a vicinity of an optical deflector mounting portion of a housing relating to the first exemplary embodiment of the present invention.

FIG. 6 shows the optical deflector 70 relating to this exemplary embodiment as described above. FIG. 7 shows a state in which the optical deflector 70 has been assembled to be accommodated inside the housing 34 of the optical scanning device 28CK or the optical scanning device 28YM.

This optical deflector 70 is a commercially available product (a general purpose component). As shown in FIG. 7, a printed circuit board 72, with a rectangular shape in plan view, is provided to serve as a base of the optical deflector 70. The polygon mirror 54, which rotates about an axis L, and a motor 74, which drives to rotate the polygon mirror 54, are disposed to be offset to one side relative to a central portion of the printed circuit board 72. The polygon mirror 54 is made of aluminum and is formed in a polygonal column shape, and a mirror face is machined at the surface of each side of the polygon mirror 54.

As shown in FIG. 6, a driving IC 78 for controlling rotary driving of the polygon mirror 54 and the motor 74 is mounted toward the other side of an upper face of the printed circuit board 72. A connector 76, at which power source and signal cables are connected, is mounted at an end portion of this other side. The driving IC 78 is an electronic component in the form of a package, with a package portion 78A being formed of a resin material.

A thermal storage member 80 is mounted at an upper face of the driving IC 78, via an adhesion member 82 with high thermal conductivity, such as a thermally conductive adhesive agent, a thermally conductive adhesive tape or the like.

The thermal storage member 80 is fabricated of an aluminum alloy, is formed in a cuboid shape (a block shape) which is larger than the driving IC 78, and has a larger thermal capacity than the package portion 78A of the driving IC 78. Further, because the thermal storage member 80 is formed in this cuboid shape, surfaces with planar form which are free of protrusions can be smoothly formed at all (six) faces thereof.

In the state in which the thermal storage member 80 has been mounted at the driving IC 78, an upper face 80A of the thermal storage member 80 is disposed at a lower side in an axial direction (the direction of arrow Z) relative to a lower face 54A of the polygon mirror 54, and a predetermined gap H is provided between the upper face 80A and the lower face 54A.

As shown in FIG. 6, this optical deflector 70 is placed on a bottom face (an optical deflector mounting portion 84) of the housing 34 with a length direction of the printed circuit board 72 oriented in a width direction of the housing 34 (the direction of arrow W), and the optical deflector 70 is mounted by fixing the four corners of the printed circuit board 72 with four screws 86. In this manner, the overall structure, including the driving IC 78 which is a heat-generating component, is accommodated in the housing 34. Because the housing 34 is a resin-molded component and the optical deflector 70 employs an inexpensive general purpose component formed as a unit, costs of the optical scanning devices 28YM and 28CK of this exemplary embodiment are suppressed.

Next, operations of this exemplary embodiment will be described. After startup of the image forming apparatus 10, when an image formation operation commences, at the optical deflector 70, which is mounted at the optical deflector mounting portion 84 of the housing 34 of the optical scanning device 28YM or 28CK as described above, the two light beams emitted from the two light source portions 40 are incident on the polygon mirror 54, and the two light beams are deflected for scanning by the polygon mirror 54 being rapidly rotated. Here, because two different optical systems are provided in the one housing 34, directions and amounts of shifts (displacements) in reading registration differ due to differences in numbers of mirrors (particularly subsequent to the optical deflector 70), arrangements of optical components, and incidence angles of the light beams at the respective mirrors.

Herein, in a stage just after startup of operations, in which the driving IC 78 rises in temperature, heat generated from the driving IC 78 is absorbed at the thermal storage member 80, via the adhesion member 82, and is stored (heat sinking/thermal storage). Consequently, a temperature gradient is restrained such that the temperature increase is slowed. This thermal storage member 80 differs from, for example, a heat sink which is cooled to promote dissipation of heat from the driving IC 78 or the like. Because the thermal storage member 80 stores the absorbed heat, amounts of heat dissipated to air in the housing 34 from the thermal storage member 80 just after startup of the device are suppressed. As the amount of heat stored in the thermal storage member 80 increases and the temperature gradually rises, the heat is gradually released. Therefore, the temperature gradient of the temperature in the housing 34 is restrained such that the increase is gentler. Hence, positional shifts due to thermal effects on the optical systems disposed in the housing 34 are mitigated, and gradients of registration variations at scanning-object surfaces which are scanned by the light beams (the photosensitive drums 24Y, 24M, 24C and 24K) are moderated.

Figure 8:
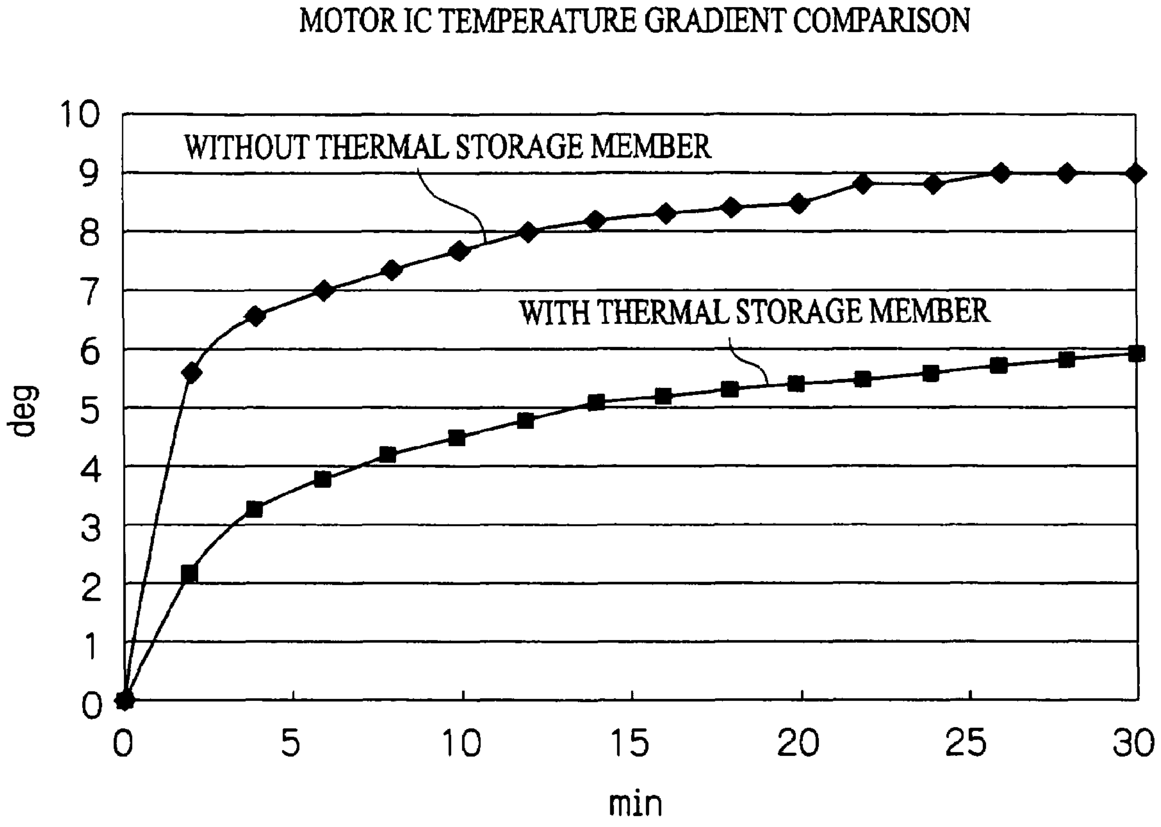
FIG. 8 is a graph showing comparative results of temperature gradients of a motor-driving IC with and without presence of the thermal storage member.
Figure 9:
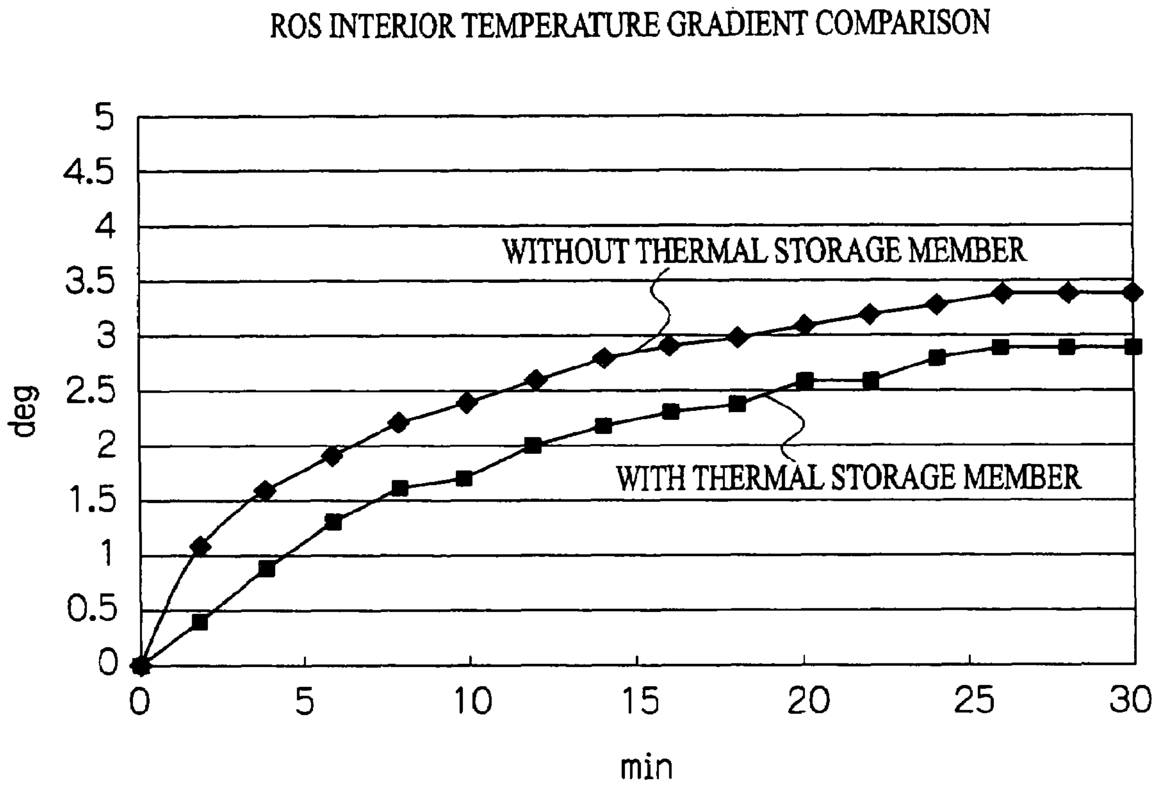
FIG. 9 is a graph showing comparative results of temperature gradients of an ROS interior with and without presence of the thermal storage member.
Figure 10:
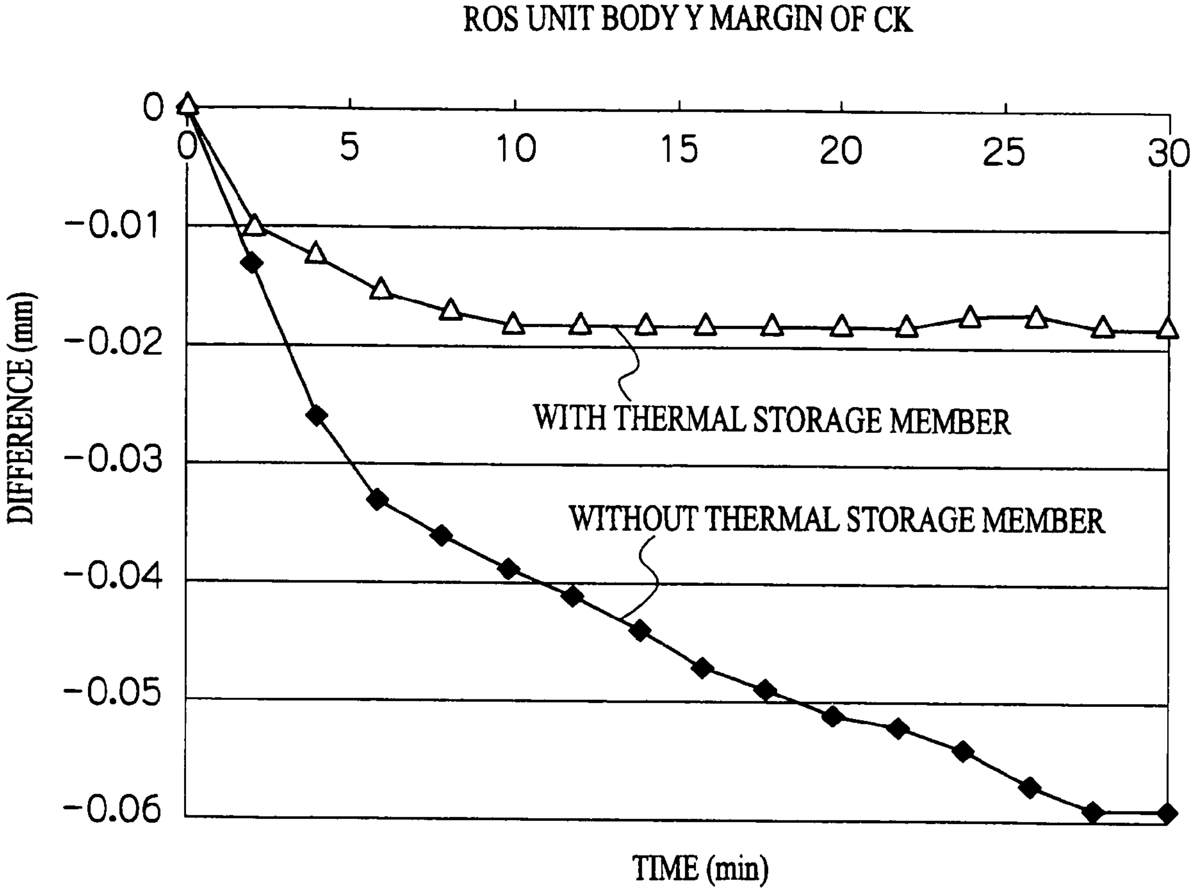
FIG. 10 is a graph showing comparative results of reading registration differences between a color C and a color K at a ROS unit body with and without presence of the thermal storage member.
Figure 11:
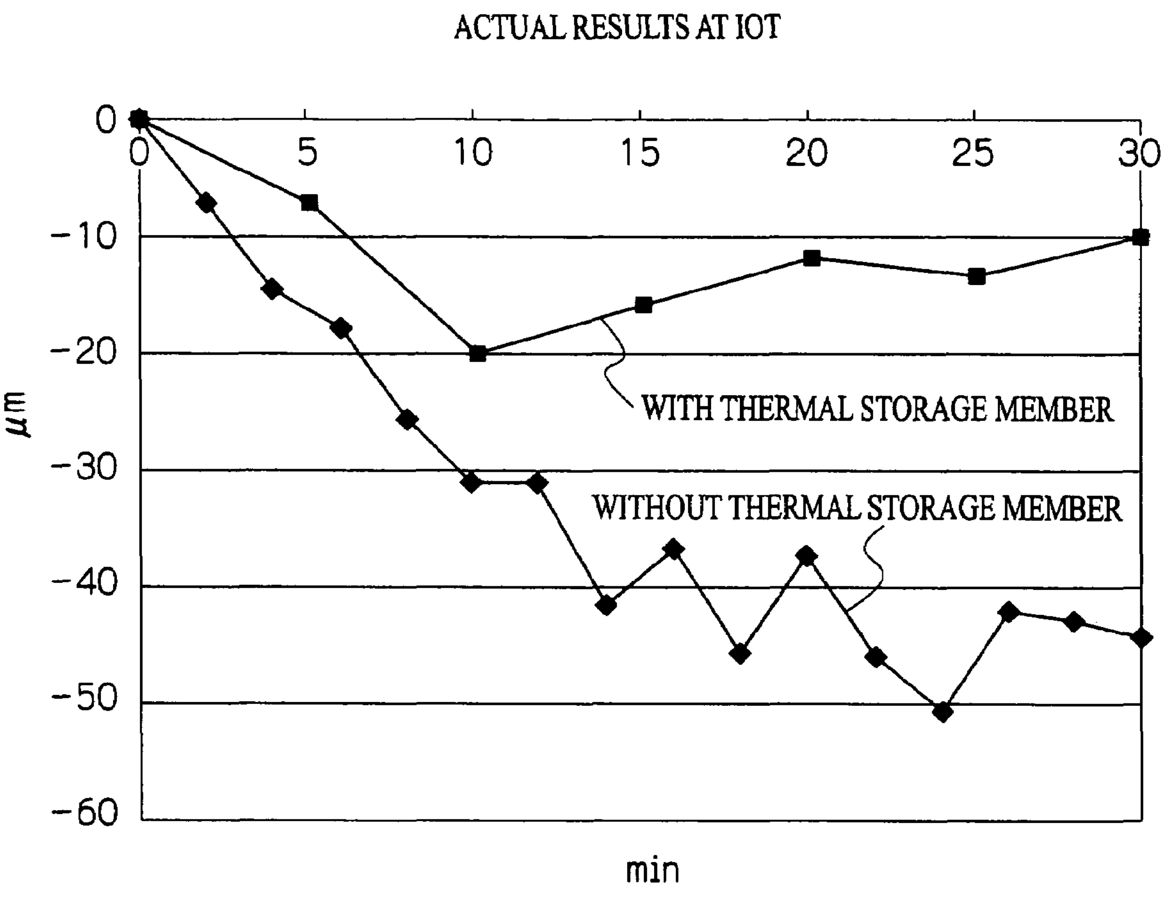
FIG. 11 is a graph showing comparative results of reading registration differences between the color C and the color K at an IOT with and without presence of the thermal storage member.

FIGS. 8 to 11 show comparative results of various measured values with and without the presence of the thermal storage member 80. When the thermal storage member 80 is mounted at the driving IC 78, then as shown in FIG. 8, the temperature gradient of the driving IC 78 is made gentler, and accordingly, as shown in FIG. 9, the temperature gradient of the housing 34 interior is made gentler. Hence, as shown in FIGS. 10 and 11, gradients of color registration variations are also slowed, and color registration variations after corresponding amounts of time have passed can be substantially reduced by half.

Thus, with the above-described image forming apparatus 10 which is provided with the optical scanning devices 28YM and 28CK, it is possible, with a simple structure in which the thermal storage member 80 is mounted at the driving IC 78 of each optical deflector 70, to suppress reading registration errors of respective colors that occur in the formation of color images just after startup of the device, and it is possible to form high-quality images.

Further, because the thermal storage member 80 of this exemplary embodiment is formed with smooth surfaces which are free of protrusions, a heat dissipation suppression effect of the thermal storage member 80 is enhanced, and it is possible to control the temperature gradient to further make the temperature increase inside the housing 34 gentler.

Further again, because the thermal capacity of the thermal storage member 80 is larger than that of the package portion 78A of the driving IC 78 which is formed of a resin material, it is possible to adequately store heat dissipated from the surface of the driving IC 78 with the thermal storage member 80, and it is possible to suppress conduction amounts (heat dissipation amounts) which are directly propagated to the air in the housing 34 from the driving IC 78.

Further yet, when the polygon mirror 54 of the optical deflector 70 is driven by the motor 74 and rotates, air currents are generated in radial directions around the polygon mirror 54. However, in this exemplary embodiment, because the upper face 80A of the thermal storage member 80 mounted at the driving IC 78 is disposed at the axial direction lower side relative to the lower face 54A of the polygon mirror 54, amounts of airflow impinging on the thermal storage member 80 are kept small, and amounts of heat dissipated from the thermal storage member 80 are suppressed.

Further still, because the thermal storage member 80 is formed of an aluminum alloy, it is possible to fabricate a thermal storage member with small size and large thermal capacity at low cost. Furthermore, because molding, mechanical machining or the like thereof is simple, it is possible to fabricate the thermal storage member in a desired shape with ease.

Second Exemplary Embodiment

Next, a second exemplary embodiment of the present invention will be described. The second exemplary embodiment is a variant example in which a mounting structure of the thermal storage member is altered. Portions that are the same as in the first exemplary embodiment are assigned the same reference numerals and descriptions thereof are omitted, and only portions that differ from the first exemplary embodiment will be described.

Figure 12:
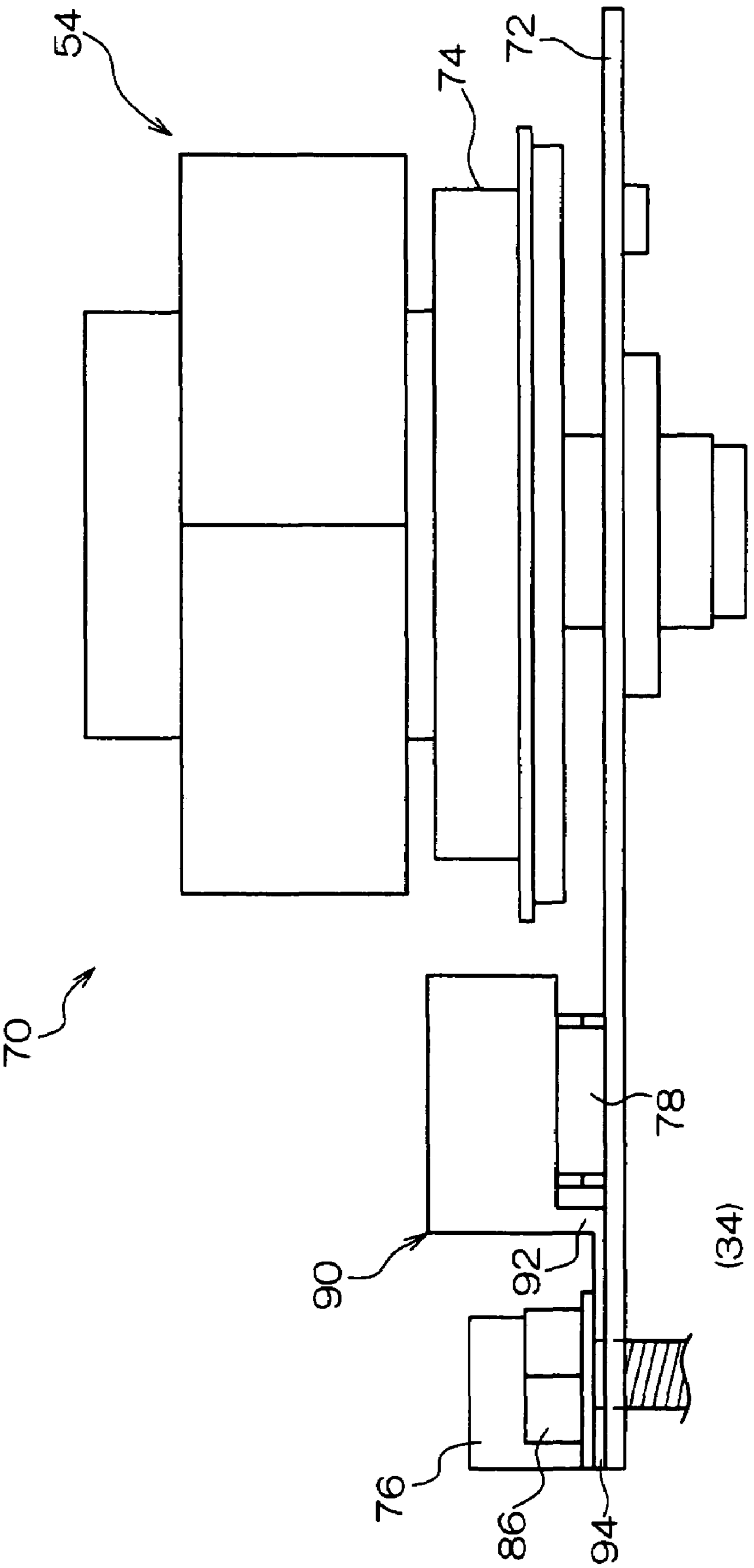
FIG. 12 is a front view showing an optical deflector at which a thermal storage member relating to a second exemplary embodiment of the present invention is provided.

As shown in FIG. 12, a thermal storage member 90 relating to the second exemplary embodiment is provided with a leg portion 92, which protrudes downward from an outer side end portion (a left side end portion in the drawing) of a lower face of the thermal storage member 90. A plate-like fixing portion 94 protrudes to an outer side direction from a lower end portion of an outer side face of the leg portion 92. Further, an unillustrated hole formed at a distal end portion of this leg portion 92 is fastened together with the optical deflector 70 by one of the screws 86 that fix the optical deflector 70 to the housing 34. Thus, the thermal storage member 90 is in a state in which a lower face thereof is in contact with the upper face of the driving IC 78, and the thermal storage member 90 is mounted on the driving IC 78.

Thus, in this exemplary embodiment, because both the thermal storage member 90 and the optical deflector 70 are fixed using the screw 86 which is for fixing the optical deflector 70 to the housing 34, the thermal storage member 90 is indirectly mounted at the driving IC 78. Because fixing means constituted by such a screw member is utilized, it is possible to mount the thermal storage member 90 at the driving IC 78 simply and firmly. Further, in comparison with a structure for directly mounting a thermal storage member as in the first exemplary embodiment, it is possible to reduce loads that are applied to lead portions (solder portions) at the driving IC 78 which is formed as a package as in this exemplary embodiment. Moreover, because there is no need to interpose an adhesive member or the like between the driving IC 78 and the thermal storage member 90, efficiency of thermal conduction from the driving IC 78 to the thermal storage member 90 is enhanced.

Third Exemplary Embodiment

Next, a third exemplary embodiment of the present invention will be described. The third exemplary embodiment is also a variant example in which the mounting structure of the thermal storage member is altered. Portions that are the same as in the first exemplary embodiment are assigned the same reference numerals and descriptions thereof are omitted, and only portions that differ from the first exemplary embodiment will be described.

Figure 13:
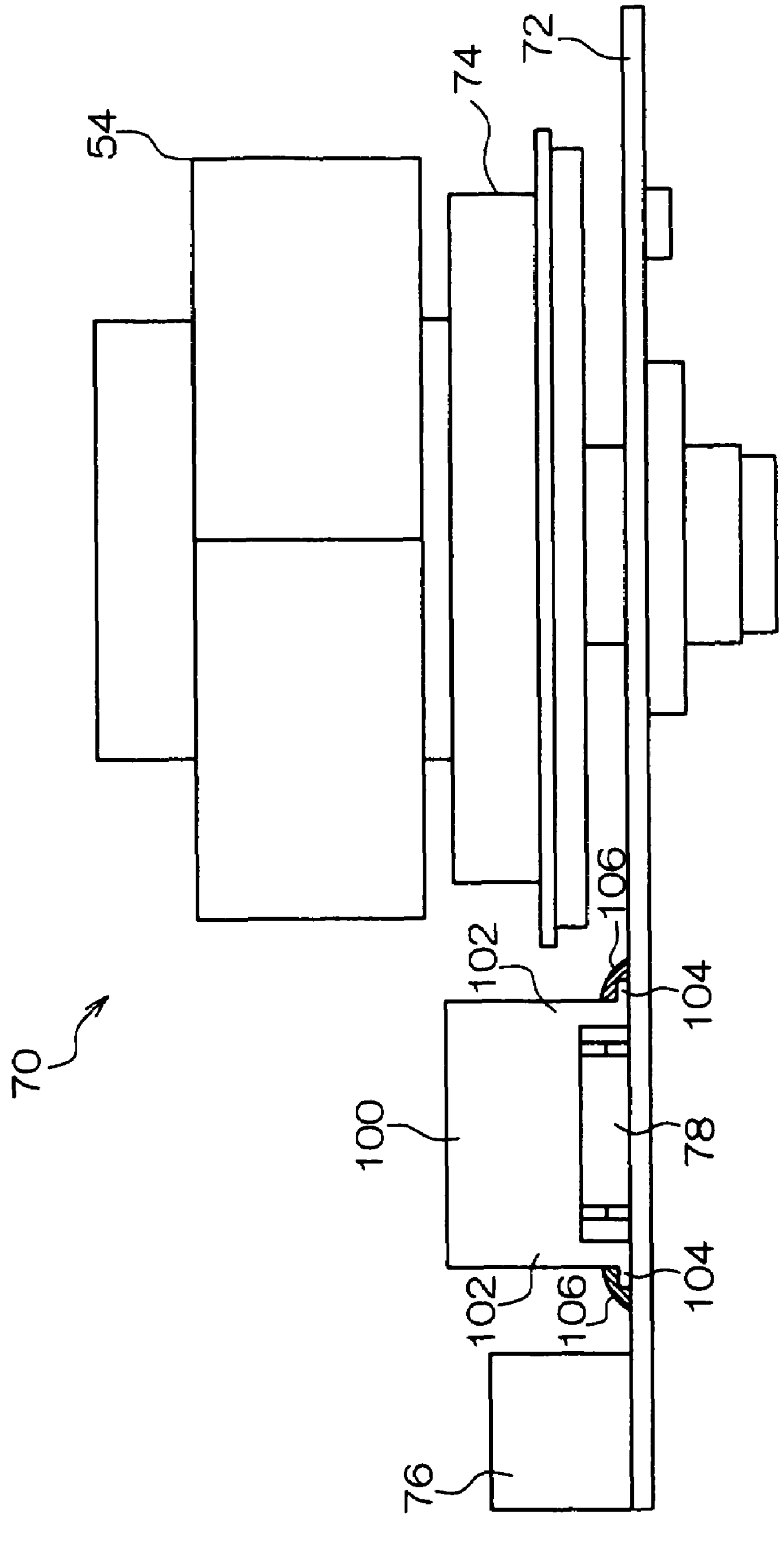
FIG. 13 is a front view showing an optical deflector at which a thermal storage member relating to a third exemplary embodiment of the present invention is provided.
Figure 14:
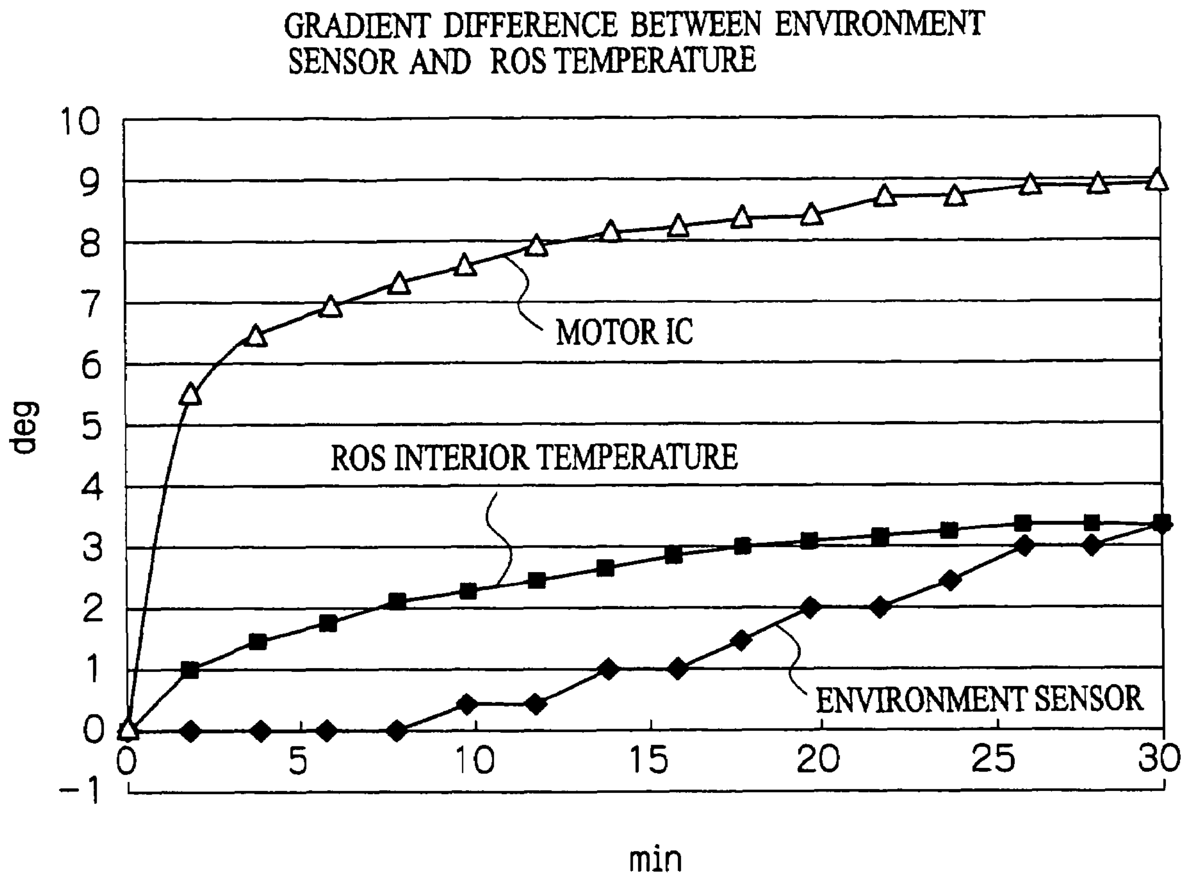
FIG. 14 RELATED ART
FIG. 14 is a graph showing differences between temperature gradients of a conventional motor-driving IC, ROS interior and environment sensor.
Figure 15:
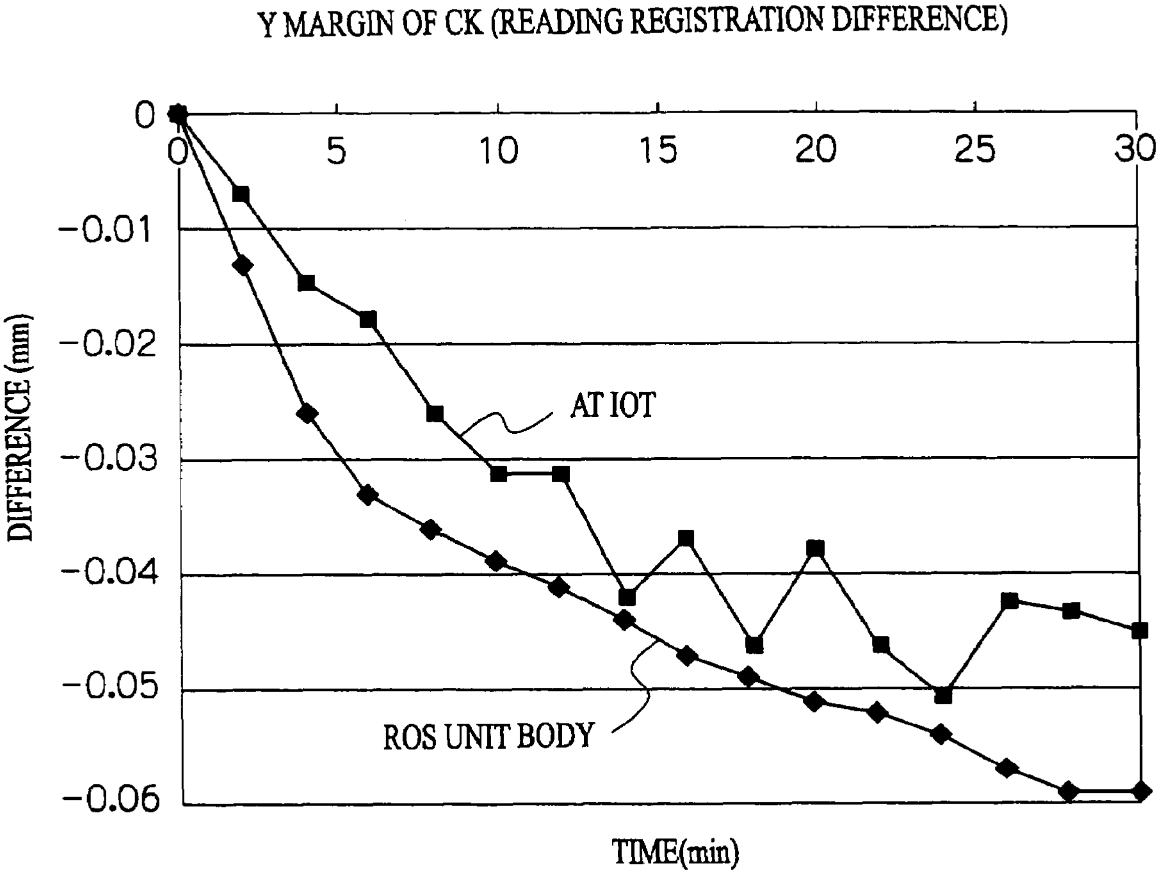
FIG. 15 RELATED ART
FIG. 15 is a graph showing reading registration differences between the color C and the color K at a conventional ROS unit body and IOT.
Figure 16:
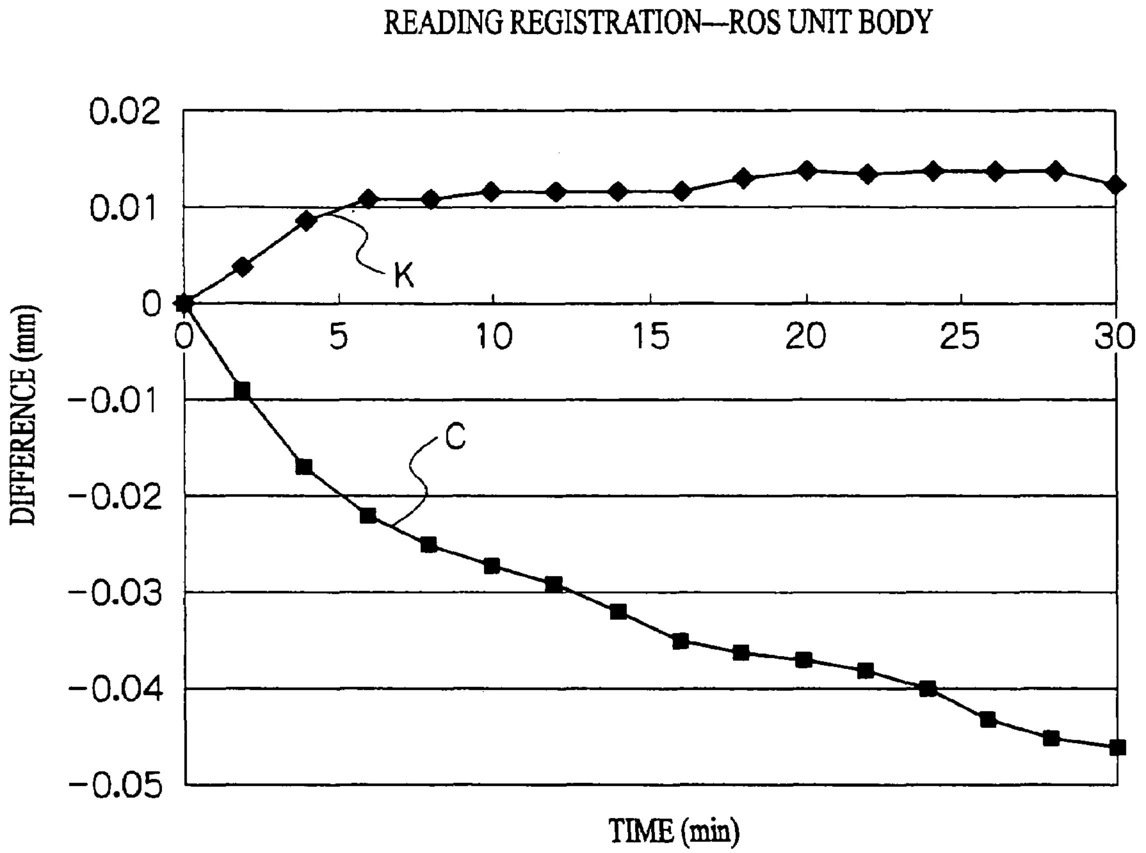
FIG. 16 RELATED ART
FIG. 16 is a graph showing a difference between reading registration offset directions of the color C and the color K at a conventional ROS unit body.
Figure 17:
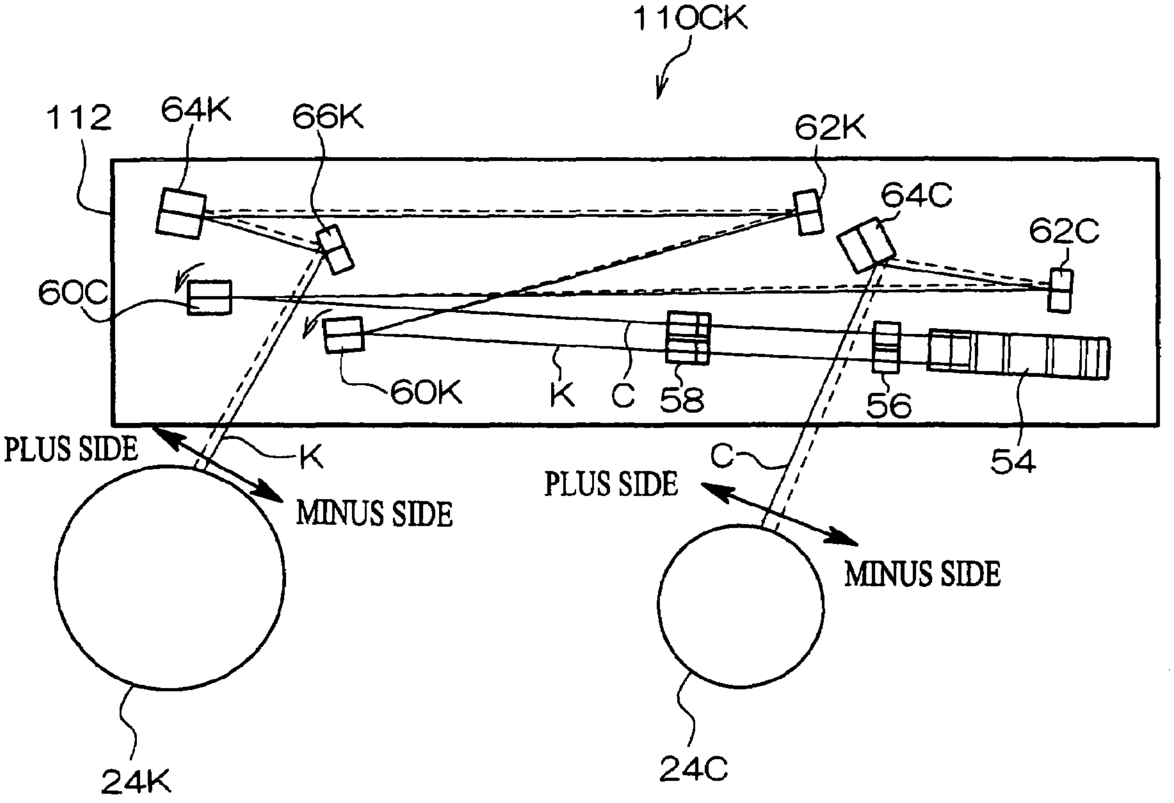
F I G. 1 7 RELATED ART
FIG. 17 is an explanatory view for explaining light paths of a conventional optical scanning device and directions of offsetting of light beams of the color C and the color K.

As shown in FIG. 13, a thermal storage member 100 relating to the third exemplary embodiment is provided with a pair of leg portions 102, which protrude downward from end portions at two sides of a lower face of the thermal storage member 100 (left and right side end portions in the drawing). A protrusion-like fixing portion 104 protrudes to an outer side direction from a lower end portion of the outer face of each leg portion 102. These fixing portions 104 are fixed with solder 106 to unillustrated copper foil lands which are formed at the upper face of the printed circuit board 72. Thus, the thermal storage member 100 is also in a state in which a lower face thereof is in contact with the upper face of the driving IC 78, and the thermal storage member 100 is mounted on the driving IC 78.

Thus, in this exemplary embodiment, because the thermal storage member 100 is soldered to be fixed to the printed circuit board 72 of the optical deflector 70, the thermal storage member 100 is indirectly mounted at the driving IC 78. Because solder is employed thus, it is possible to mount the thermal storage member 100 at the driving IC 78 simply and robustly. Further, similarly to the second exemplary embodiment, it is possible to reduce loads that are applied to lead portions (solder portions) of the driving IC 78 and, because there is no need to interpose an adhesive member or the like between the driving IC 78 and the thermal storage member 100, efficiency of thermal conduction from the driving IC 78 to the thermal storage member 100 can be enhanced.

Although in the foregoing embodiments, the present invention has been applied to color image forming apparatus, it is to be understood that the present invention is equally applicable to monochrome image forming apparatus.

Hereabove, specific embodiments of the present invention have been exemplified and described in detail. However, the present invention is not limited to these exemplary embodiments, and is to be understood as encompassing various changes and modifications which can be implemented without deviating from the appended claims.

What is claimed is:

1. An optical scanning device comprising:

a light source that emits a light beam;

an optical deflector at which a light beam emitted from the light source is incident, the optical deflector deflecting the incident light beam;

an optical system that guides the deflected light beam to surface to be scanned by the deflected light beam;

a driving device that drives at least a portion of the optical deflector;

a thermal storage member mounted on the driving device, the thermal storage member absorbing and storing heat generated by the driving device, thereby controlling a temperature gradient of the driving device; and a casing body that accommodates the light source, the optical deflector, the optical system, the driving device, and the thermal storage member.

2. The optical scanning device of claim 1, wherein the light source emits a plurality of light beams.

3. The optical scanning device of claim 1, wherein the thermal storage member comprises a surface which is free of protrusions and smoothly formed.

4. The optical scanning device of claim 1, further comprising a package portion that packages the driving device, wherein the thermal storage member has a higher thermal capacity than the package portion.

5. The optical scanning device of claim 1 wherein the driving device controls driving of a rotary driving source of a rotating multi-face mirror provided on the optical deflector, and wherein the thermal storage member mounted on the driving device is arranged such that an upper surface thereof is disposed at an axially lower side relative to a lower surface of the rotating multi-face mirror.

6. The optical scanning device of claim 1, wherein the thermal storage member is formed from aluminum or aluminum alloy.

7. The optical scanning device of claim 1, further comprising a fixing member that fixes the optical deflector to the casing body, wherein the fixing member is used to fix the thermal storage member to the casing body with the optical deflector.

8. The optical scanning device of claim 1, wherein the optical deflector comprises a circuit board, and the thermal storage member is fixed to the circuit board by soldering.

9. The optical scanning device of claim 1, wherein the thermal storage member is attached to the driving device with a thermally conductive adhesive.

10. An image forming apparatus comprising:

an optical scanning device; and an image forming unit that comprises an image carrier on which an electrostatic latent image is formed by the optical scanning device and a developing part that forms a toner image based on the electrostatic latent image, wherein the optical scanning device comprises:

a light source that emits a light beam;

an optical deflector at which a light beam emitted from the light source is incident, the optical deflector deflecting the incident light beam;

an optical system that guides the deflected light beam to the surface of the image carrier;

a driving device that drives at least a portion of the optical deflector;

a thermal storage member mounted on the driving device, the thermal storage member absorbing and storing heat generated by the driving device, thereby controlling a temperature gradient of the driving device; and a casing body that accommodates the light source, the optical deflector, the optical system, the driving device, and the thermal storage member.

11. The image forming apparatus of claim 10, wherein the light source emits a plurality of light beams.

12. The image forming apparatus of claim 10, wherein the thermal storage member comprises a surface which is free of protrusions and smoothly formed.

13. The image forming apparatus of claim 10, wherein the optical scanning apparatus further comprises a package portion that packages the driving device, and wherein the thermal storage member has a higher thermal capacity than the package portion.

14. The image forming apparatus of claim 10, wherein the driving device controls driving of a rotary driving source of a rotating multi-face mirror provided on the optical deflector, and wherein the thermal storage member mounted on the driving device is arranged such that an upper surface thereof is disposed at an axially lower side relative to a lower surface of the rotating multi-face mirror.

15. The image forming apparatus of claim 10, wherein the thermal storage member is formed from aluminum or aluminum alloy.

16. The image forming apparatus of claim 10, wherein the optical scanning device further comprises a fixing member that fixes the optical deflector to the casing body, wherein the fixing member is used to fix the thermal storage member to the casing body with the optical deflector.

17. The image forming apparatus of claim 10, wherein the optical deflector comprises a circuit board, and the thermal storage member is fixed to the circuit board by soldering.

18. The image forming apparatus of claim 10, wherein the thermal storage member is attached to the driving device with a thermally conductive adhesive.

* * * * *